March 31, 1970     D. H. CAMPBELL     3,504,326
POTENTIOMETER WITH FRICTION DRIVE ACTUATION
Filed Nov. 18, 1968
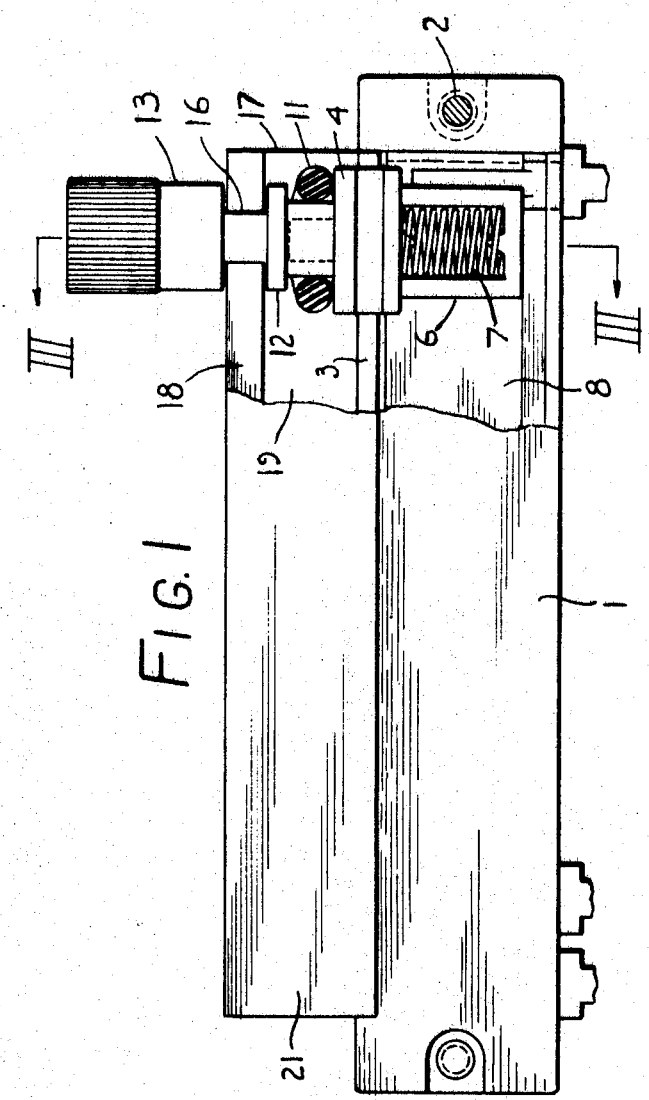
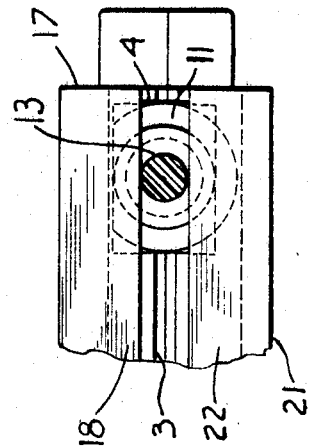
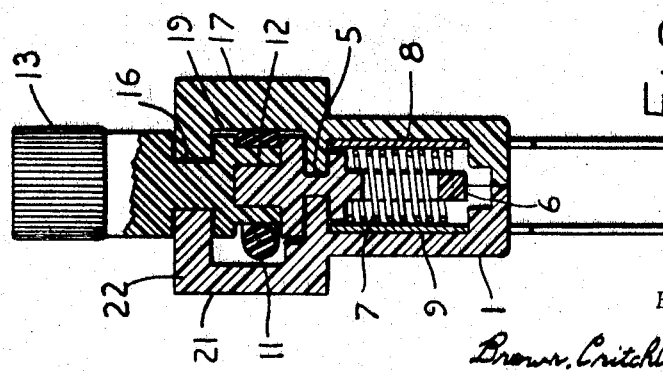
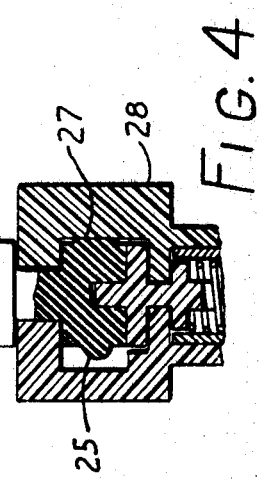
INVENTOR.
DUDLEY H. CAMPBELL
BY
*Brown, Critchlow, Flick & Peckham.*
ATTORNEYS

United States Patent Office 3,504,326
Patented Mar. 31, 1970

3,504,326
POTENTIOMETER WITH FRICTION DRIVE ACTUATION
Dudley H. Campbell, Raleigh, N.C., assignor to Stackpole Components Company, Raleigh, N.C., a corporation of Delaware
Filed Nov. 18, 1968, Ser. No. 776,664
Int. Cl. H01c 5/02
U.S. Cl. 338—183        10 Claims

ABSTRACT OF THE DISCLOSURE

An elongated potentiometer housing has a longitudinal slot in its front, in which is disposed a slide that carries a bridging contact engaging resistance and collector elements inside the housing. In front of the slot is a circular friction member that is rotatably connected with the slide and that tightly engages a friction surface extending lengthwise of the slot. When the friction member is turned, it rolls along the friction surface and thereby moves the slide along the slot.

---

Potentiometers of the general type disclosed herein have been provided with racks and gears for moving their slides. Thus, a gear has been rotatably connected to a slide and meshed with hte teeth of a rack extending lengthwise of the potentiometer housing. When the gear is turned by a knob or the like it must travel along the rack and thereby move the slide. That manner of adjusting a potentiometer is satisfactory as far as operation is concerned, but it requires the production of rack and gear teeth.

It is among the objects of this invention to provide a linear motion potentiometer, in which the contact-carrying slide can be moved by turning a member that makes only frictional contact with an adjoining surface, in which the slide can also be pushed along the slot, and in which no damage to the potentiometer will occur if the operator continues to turn the knob after the slide reaches either end of the housing slot.

The invention is illustrated in the accompanying drawings, in which:

FIG. 1 is a side view of the potentiometer, with part of the near wall broken away;

FIG. 2 is a fragmentary front view, with the knob in section;

FIG. 3 is an enlarged cross section taken on the line III—III of FIGS. 1; and

FIG. 4 is a similar, but fragmentary, cross section of a modification.

Referring to FIGS. 1 to 3 of the drawings, the long rectangular housing 1 of a potentiometer may be formed from a molded plastic or other suitable rigid material. The housing preferably is made from two molded half sections that have meeting edges extending from front to back across the ends of the housing and lengthwise along its back. The half sections are joined together in any suitable manner, such as by rivets 2 or a spring clamp. The front of the housing is provided with a centrally located longitudinal slot 3, in which a slide 4 is slidably mounted. The opposite sides of the slide are provided with grooves 5 (FIG. 3) that receive the front wall of the housing at the opposite sides of its slot. Extending from the slide toward the back of the housing is a frame 6, in which is mounted a coil spring 7 that serves as a bridging contact engaging a metal collector strip 8 and an electrical resistance strip 9 located at opposite sides of the inside of the housing.

It is a feature of this invention that the slide can be moved back and forth to adjust the potentiometer by turning a circular member that frictionally engages an adjoining surface that may be perfectly smooth or roughened. Accordingly, a circular friction member 11 in front of the housing slot is rotatably connected with the slide, such as by a pin 12 that can be secured to either the slide or the member that carries the friction member, and rotatably mounted in the other. Preferably, the pin is joined to the slide and projects into a socket in the inner or rear end of a knob 13 that carries the friction member. The latter is shown as a ring of elastic material, preferably an O-ring of rubber or the like. The ring fits tightly around the inner end portion of the knob so that it can be turned by the knob.

To hold the knob on the pin, the knob is provided with an annular groove 16, into which stationary means connected with the potentiometer housing projects. This stationary means may be a separate element connected with the housing, but preferably it is integral with the housing, such as a flange 17 extending forward from and lengthwise of the front of the housing and provided along its forward edge with a lateral rib 18 that projects into the knob groove to prevent the knob from sliding off the pin.

Between the rib and the front of the housing the inner side of the flange provides a friction surface 19 that extends lengthwise of the slot and that is tightly engaged by the friction ring. The portion of the ring engaging the friction surface is compressed between the flange and the encircled portio nof the knob, as shown in FIG. 3. Consequently, when the knob is turned, the ring will be turned by it and will roll along the flange to move the slide along the slot to adjust the potentiometer. It generally is desirable to provide the housing with a second flange 21 at the side opposite the first flange. The second flange may also have a rib 22 along its outer edge projecting the groove in the knob. The second flange is thinner than the other one so that the O-ring will not touch it. The two flanges and their ribs conceal the O-ring.

There may be instances where it is desirable to push the slide along the potentiometer housing without rotating the knob. This would allow quick long movements of the slide, following which a fine adjustment can be made by turning the knob. This invention permits the knob and slide to be pushed along the housing, because the friction ring can slide along the adjoining flange surface 19 if the knob is restrained from turning. Also, if a person should continue to turn the knob after the slide has reached the limit of its travel at either end of the housing, no damage will be done because either the friction ring will slip against the adjoining flange or the knob will turn within the ring.

In the modification shown in FIG. 4, the circular friction member 25 is integral with the knob 26. This is possible because in this case the knob itself is made of elastic material, such as rubber, so the inner end portion of the knob can be shaped to serve as a circular friction member that will tightly engage the flat friction surface 27 of the adjoining flange 28. The advantage of this construction is that separate O-rings do not have to be purchased, handled and applied to the knobs.

It will be observed that with this invention no gear has to be formed and no surface has to be provided with rack teeth for receiving gear teeth.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:
1. A linear motion potentiometer comprising an elongated housing having a front and back connected by side walls, the front of the housing having a longitudinal slot therein, resistance and collector elements disposed in the housing lengthwise thereof, a slide disposed in said slot and movable lengthwise thereof, a bridging contact inside the housing carried by the slide in sliding engagement with said elements, a circular friction member in front of said slot rotatably connected with the slide, stationary means at one side of the front of the slot provided with a friction surface extending lengthwise of the slot beside said member and tightly engaged by it, and means for turning the friction member to cause it to roll along said friction surface and thereby move the slide along said slot.

2. A linear motion potentiometer according to claim 1, in which said friction member is a ring of elastic material.

3. A linear motion potentiometer according to claim 1, in which said turning means is a knob carrying said friction member.

4. A linear motion potentiometer according to claim 3, in which said friction member is an O-ring of elastic material encircling the knob in tight engagement therewith.

5. A linear motion potentiometer according to claim 3, in which said friction member is integral with the knob, and said member and knob are made of elastic material.

6. A linear motion potentiometer according to claim 3, including a pin rotatably connecting the knob to the slide.

7. A linear motion potentiometer according to claim 1, in which said turning means include a pin rigidly connected to the slide and projecting away from the front of said slot, and a knob rotatably mounted on said pin and carrying said friction member.

8. A linear motion potentiometer according to claim 7, in which said knob is provided with an annular groove, and said stationary means projects laterally into said groove to hold the knob and pin and slide together.

9. A linear motion potentiometer according to claim 1, in which said turning means is a knob carrying said friction member and provided with an annular groove in front of that member, and said stationary means is a flange extending forward from the front of said housing and provided along its forward edge with a rib projecting into said groove.

10. A linear motion potentiometer according to claim 9, in which said friction member is an elastic O-ring tightly encircling the knob between said rib and housing.

References Cited

UNITED STATES PATENTS

| 789,456 | 5/1905 | Rupley | 338—182 |
| 2,091,371 | 8/1937 | McMaster | 338—181 |
| 3,362,004 | 1/1968 | Bang | 338—183 |
| 3,431,529 | 3/1969 | Bang | 338—183 |
| 3,431,530 | 3/1969 | Bang | 338—183 |

THOMAS J. KOZMA, Primary Examiner

U.S. Cl. X.R.

338—184